United States Patent [19]
Scott

[11] 4,418,286
[45] Nov. 29, 1983

[54] WAVE AND TIDAL ENERGY DRIVEN ELECTRIC GENERATOR

[76] Inventor: Lisbon Scott, 7920 Bi-County Rd., Apt. 10, Norfolk, Va. 23518

[21] Appl. No.: 328,199

[22] Filed: Dec. 7, 1981

[51] Int. Cl.³ ............................................. F03B 13/12
[52] U.S. Cl. ........................................ 290/42; 290/53; 60/507; 417/331
[58] Field of Search ...................... 290/42, 53; 60/495, 60/497, 500, 501, 505–507; 417/100, 330–333

[56] References Cited

U.S. PATENT DOCUMENTS 1,314,147  8/1919  Osborn ................................ 417/331
1,667,152  4/1928  Hegge .................................. 60/505

FOREIGN PATENT DOCUMENTS 556782  7/1923  France ................................... 60/497

Primary Examiner—J. V. Truhe
Assistant Examiner—Shelley Wade
Attorney, Agent, or Firm—Mills & Coats

[57] ABSTRACT

This invention is an electric generator system which is wave and/or tidal driven and includes energy storage means to allow a constant electrical output to be realized. The above is accomplished through a counterbalanced walking beam which is wave driven. This beam is connected to one way ratchet drives and an interconnected spring system of varying torque capacities. A governor is connected to the spring system thereby allowing the generator to be driven at a constant speed.

8 Claims, 3 Drawing Figures

WAVE AND TIDAL ENERGY DRIVEN ELECTRIC GENERATOR

FIELD OF INVENTION

This invention relates to electrical generation systems and more particularly to wave energy driven generators with energy storage means for constant predetermined electrical output.

BACKGROUND OF INVENTION

Since man first began generating electricity he has eyed the oceans around him as possible driving means. Various systems have been tried including sequential arrangement of floats so that more consistent and nearly continuous generator drive can be accomplished. Also various apparatuses have been experimented with using weights and the like to storage energy. None of these prior art systems, however, have proved adequate for storing substantial amounts of energy which can later be bled off at a constant predetermined rate thereby giving a dependable power source regardless of variations in wave heights or frequency and which can also take advantage of tidal fluctuations to create additional storable energy.

BRIEF DESCRIPTION OF INVENTION

After much research and study into the above-mentioned problems, the present invention has been developed to provide a method of driving an electrical generator at a constant predetermined speed regardless of variations of wave heights or frequencies and also taking advantage of tidal fluctuations. This is accomplished through the use of a walking beam type drive arm with a float on one end and counterbalance weights on the other end. A plurality of varied torque springs are operatively interconnected with one-way drives being used to tighten the springs when the walking beam moves in either direction. Thus both wave action and the rising and falling of the tide will add tension to the energy storing springs. This, combined with a speed control and torque converter, allows the generator to be driven at a constant speed which in turn gives a constant electrical output.

In view of the above, it is an object of the present invention to provide a wave and tide driven electric generator system which is capable of a steady kilowatt output.

Another object of the present invention is to provide an electric generator system with an energy storage means to allow the generator to be run at a constant RPM thus giving a consistent electrical output.

Another object of the present invention is to provide a wave energy driven electricity generator which stores energy both on the rise and fall of the waves as well as the rise and fall of the tide to enable the generator to give a constant current output.

Another object of the present invention is to provide an energy storage means in the form of a plurality of coil type springs of varying strengths to allow a constant output torque and RPM to be accomplished.

Another object of the present invention is to provide an improved wave driven electric generator system which is highly efficient and yet gives a predictable steady output of electrical energy.

Other objects and advantages of the present invention will become apparent and obvious from a study of the following description and the accompanying drawings which are merely illustrative of such invention.

DETAILED DESCRIPTION OF INVENTION

Figure 1:
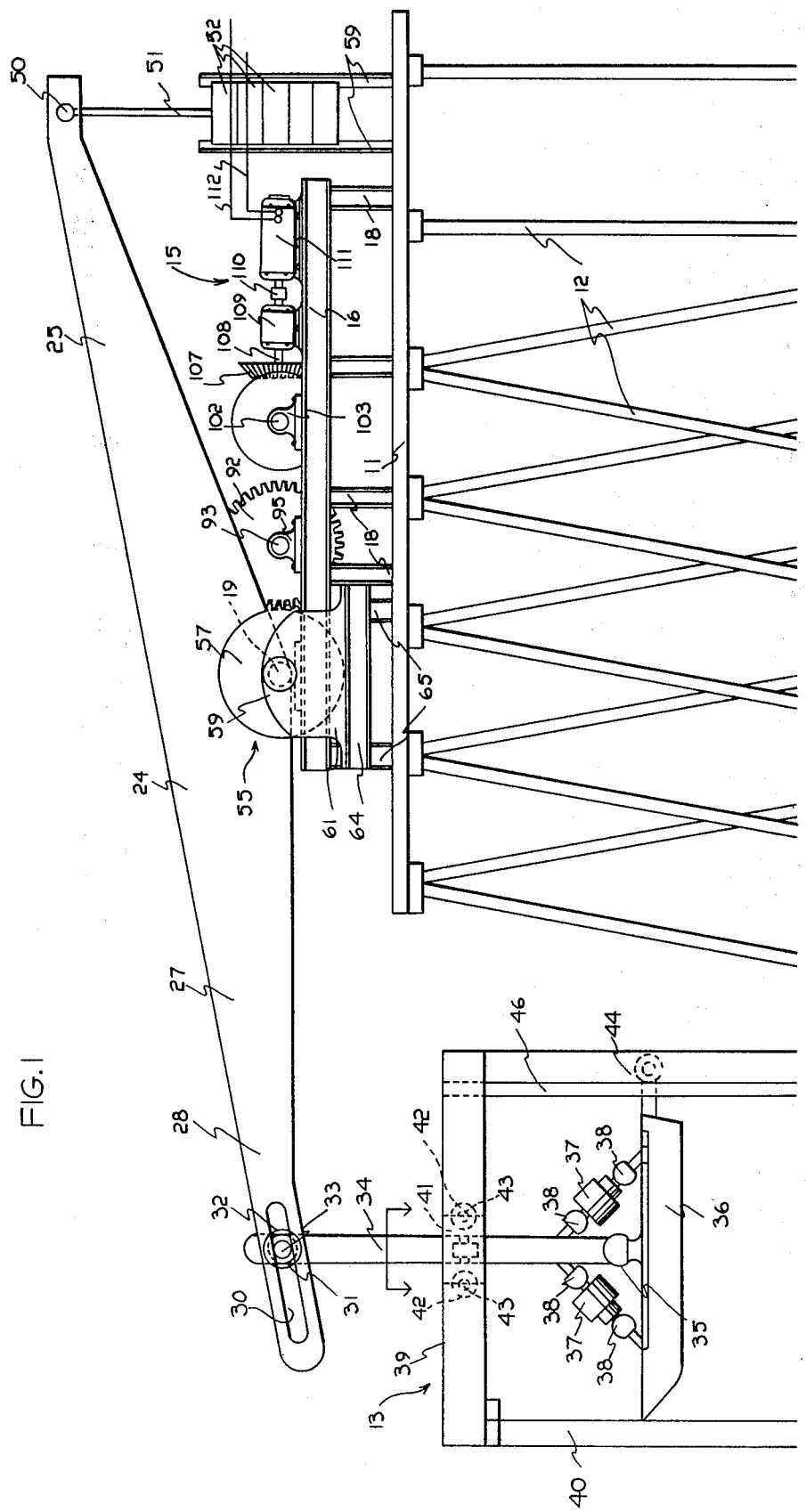
FIG. 1 is a side elevational view of the wave and tide energy driven electric generator system of the present invention.

With further reference to the drawings, the wave driven electric generator system of the present invention, indicated generally at 10, includes a platform 11 supported by pilings 12 or other suitable structure. Since sea bed supported platforms are in a high state of technology and are well known to those skilled in the art, further detailed discussion of this portion of the present invention is not deemed necessary.

The wave and tidal energy driven electric generation system 10 of the present invention is composed of three basic portions, the wave energy transducer portion, the energy storage portion, and the electricity generation portion. These three portions of the present invention are indicated generally at 13, 14 and 15, respectively in the drawings.

Referring now more specifically to the equipment platform 11, a pair of equipment mounting rails 16 and 17 are provided which are held in relative fixed position to said platform 11 by supports 18. A main power shaft 19 is rotatively mounted through bearings 20 and 21 to mounting rails 16 and 17, respectively.

Mounted on shaft 19 and supported by bearings 22 and 23 is a tuning fork shaped walking beam 24. This beam includes elongated arm portions 25 and 26, curved connecting portion 27, and a float driven arm portion 28.

The end of arm portion 28 includes a vertical slot 29 passing therethrough with a pair of opposed horizontal slots 30 communicating through the sides of such arm portion. Rollers 31 having shoulders 32 are adapted to rollingly engage the vertical slots 29. These rollers 31 are mounted one on each end of roller shaft 33. This roller shaft in turn passes through one end of float drive shaft 34.

The end of float drive shaft 34 opposite roller shaft 33 is ball and socket connected at 35 to float 36 to give a universal connection between the float and the float drive shaft.

Shock absorbers 37, preferable of the hydraulic type, are provided at preferably 90 degree intervals about drive shaft 34 and are connected to such drive shaft and to the float 36 by ball and socket type universal connectors 38 so that any swiveling movement between said shaft and said float can be damped. The amount of travel provided for in each of the shock absorbers 37 must, of course, be adequate to allow float 36 to generally conform itself to the surface of the swell or wave passing thereunder.

To assure that drive shaft 34 remains basically vertically disposed and does not begin to pendulum swing from the end of arm portion 28, a float platform 39 is provided. This platform is supported by a plurality of pilings 40 which are driven into the ocean floor (not shown).

Figure 3:
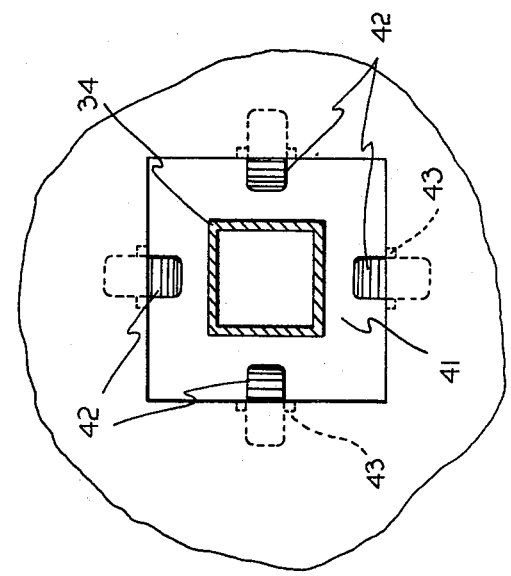
FIG. 3 is an enlarged top plan view of the float guide means thereof.

In the center of float platform 39 is an opening 41. This opening has disposed therein a plurality of guide wheels or rollers 42 which are rotatively mounted on shafts 43 supported by platform 39. Float drive shaft 34 is adapted to pass through the central area of opening 41 and is reciprocatingly held in this position by the four rollers 43 as can clearly be seen in FIG. 3.

To further assure that the wave energy imparted to float 36 is channeled in an up and down direction without loss due to random side motions, a pair of channels 44 and 45 are vertically disposed along one edge of float platform 39. Elbow shaped stabilizing arms 46 and 47 are fixedly secured at one end to float 36 as clearly shown in FIG. 1. Rotatively mounted on their opposite ends are guide rollers 48 and 49 which are adapted to be rollingly disposed within channels 44 and 45, respectively.

Thus it can be seen that through the use of guide rollers 48 and 49 connected to float 36, and platform rollers 42 guiding drive shaft 34, the movement of said float 36 is limited to up and down vertical motion.

As float 36 moves up and down within the confines of float platform 39 and its related structure, an up and down motion is imparted to the drive arm portion 28 of walking beam or boom 24. This up and down movement of the arm position causes said walking beam itself to rock back and forth about main power shaft 19.

Extended between and connecting the outer ends of elongated arm portions 25 and 26 of walking beam 24 is a counterweight bar 50. This bar has at least two weight rods 51 depending therefrom which are adapted to removingly carry a plurality of counterweights 52. Since these counterweights can be added or removed as necessary, they are adjustable as to the amount of weight carried. This adjustment can be accomplished by any one of a number of manners including the providing of slots 53 which align with weight supporting rods 51 so that the individual weights 52 can be added or removed by sliding them on or off horizontally.

A plurality of weight guides 54 are secured at one end to platform 11 and extends vertically therefrom to cradle the weights 52 thus allowing the same to move only generally up and down in vertical reciprocation.

From the above it can be seen that the walking beam 24 is pivotably mounted for rocking movement about shaft 19 with float 36 being counterbalanced by weights 52. This counterbalancing not only makes reciprocating movement easier but also provides for greater momentum and thus driving power in walking beam 24.

Figure 2:
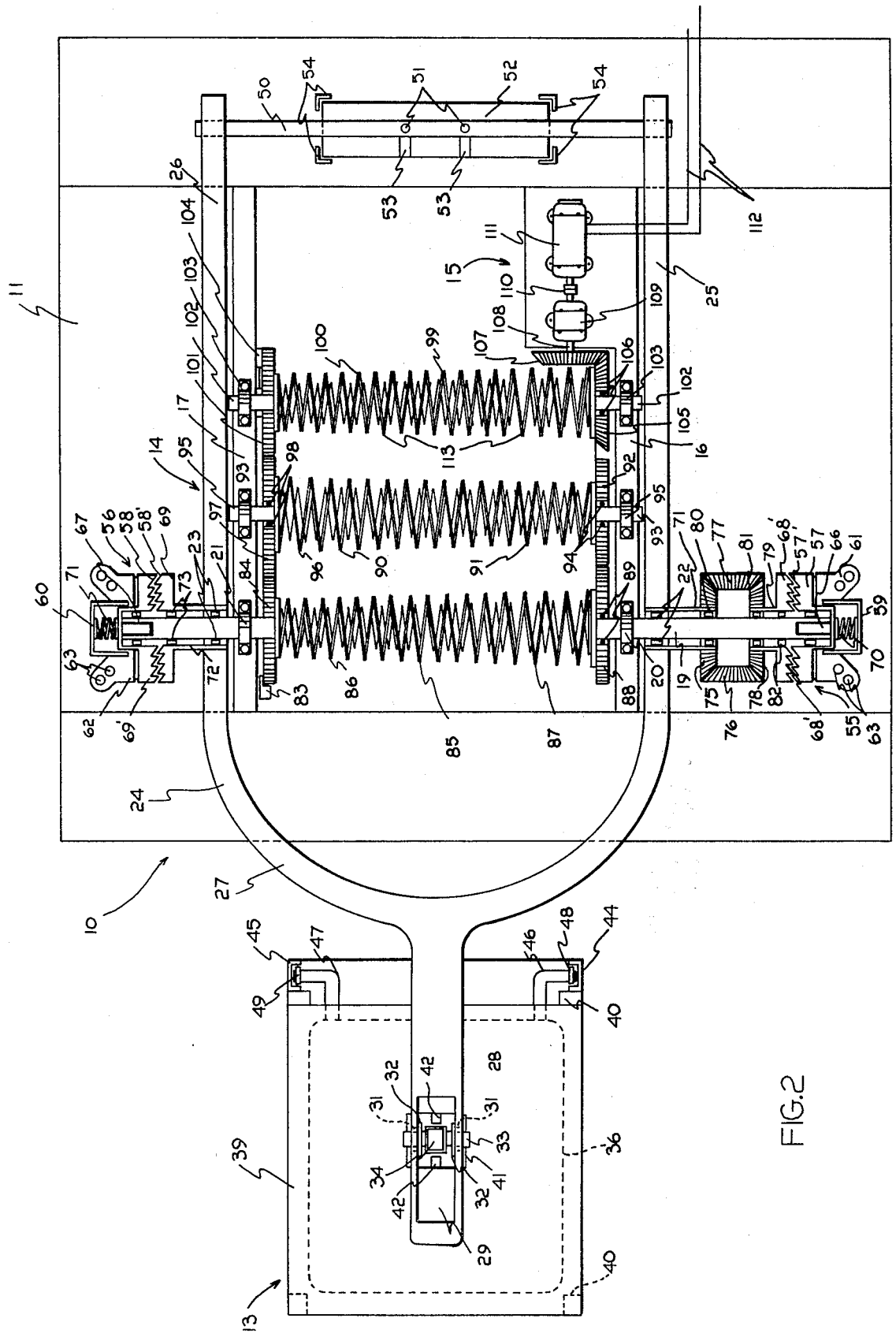
FIG. 2 is a top plan view thereof.

Referring now more specifically to the energy storage portion 14 of the present invention, a pair of unidirectional ratchet clutches, indicated generally at 55 and 56, are provided. Each of these ratchet clutches includes a driven ratchet plate 57 and 58, respectively, each of which is slidably mounted through spline and groove connections 66 and 67 to respective ends of shaft 19 and each of such driven plates includes ratchet teeth 57' and 58' as seen clearly in FIG. 2.

Ratchet spring housing 59 and 60 are fixedly secured to platform 11 by way of support bracket 61 and 62 respectively which are bolted as indicated at 63 to mounting rails 64 with supports 65 connecting such rails to said platform 11.

Ratchet springs 71 and 72 are disposed between the interior of spring housings 59 and 60 and the respective adjacent driven ratchet plates 57 and 58. These springs are compression springs which bias each of the last mentioned ratchet plates inwardly on respective ends of main power shaft 19 as can clearly be seen in FIG. 2.

Ratchet drive plates 68 and 69 are disposed in operative contact with driven ratchet plates 57 and 58 through engagement of ratchet teeth 68' and 69' with ratchet teeth 57' and 58' respectively.

Ratchet drive plate 69 is fixedly secured to one end of power shaft housing 72 with the other end of such housing fixedly secured to arm 26 of walking beam 24. Bearings 73 support shaft housing 72 and its connected ratchet drive plate 69 in rotative relationship with main power shaft 19.

From the above it can be seen that as float 36 moves upwardly on an incoming wave or swell, float arm 28 of walking beam 24 will move upwardly with elongated arm portions 25 and 26 moving downwardly. As this occurs, ratchet drive plate 69 will follow the same rotative movement with teeth 69' slipping over the teeth 58' of driven ratchet plate 58 with such last mentioned plate moving inwardly and outwardly against the tension of ratchet spring 71 in the normal manner of such devices. When float 36 drops as the wave passes, the walking beam 24 will pivot in the opposite direction thus engaging teeth 58' with teeth 69' to allow drive plate 69 to drive driven plate 58 which, through spline groove connection 57, drives main power shaft 19 in the same direction that the walking beam is rotated, i.e. in a counterclockwise direction as viewed in FIG. 1. Thus it can be seen that each time the float 36 drops, main drive shaft 19 will be rotated in the above mentioned counterclockwise direction.

Power shaft housing 74 is fixedly secured at one end to elongated arm 25 of walking beam 24. The other end of this shaft housing is fixedly secured to beveled drive gear 75. Rotation reversing opposed bevel differential gears 76 and 77 operatively engaged drive gear 75 as well as driven beveled gear 78 as can clearly be seen in FIG. 2. This last mentioned gear is fixedly connected to one end of power shaft housing 79 which in turn is fixedly secured at its opposite end to ratchet drive plate 68.

Bearings 80 rotatively mount the end of power shaft housing 74 adjacent beveled drive gear 75 on main power shaft 19. Likewise, bearings 81 and 82 rotatively mount power shaft housing 79 adjacent driven beveled gear 78 and ratchet drive plate 68 respectively.

From the above it can be seen that as float 36 drops moving walking beam 24 in a counterclockwise direction as seen in FIG. 1, through power housings 74 and 79 and beveled gears 75, 76 and 77 and 78, the engaging teeth 68' and 57' of plates 68 and 57 will disengage allowing such plates to rotate one relative to the other against the bias of ratchet springs 70. As float 36, on the other hand, moves upwardly rotating walking beam 24 in a clockwise direction as seen in FIG. 1, teeth 57' and 68' will engage thus driving main power shaft 19 in a counterclockwise direction.

In summary ratchet clutch 55 drives main power shaft 19 in a counterclockwise direction when float 36 is arising and ratchet clutch 56 drives said power shaft in the same direction when float 36 is falling. This unidirectional drive is imparted to shaft 19 both on the upward movement and on the downward movement of said float.

To assure that power shaft 19 turns in one direction only, a ratchet mechanism 83 is provided in operative conjunction with ratchet wheel 84 which in turn is fixedly secured to main power shaft 19. Thus as said power shaft 19 moves in a counterclockwise direction, said ratchet mechanism 83 will allow ratchet wheel 84 to turn in the normal manner of such devices and yet when opposite or clockwise torque is placed on said shaft, said ratchet mechanism will engage said ratchet wheel preventing movement in such opposite direction.

The smaller ends 86 of a pair of tapered, superimposed primary energy storage springs 85 are fixedly secured to ratchet wheel 84. The opposite or larger ends 87 of each of the pairs of springs 85 are fixedly secured to primary output gear 88.

Output gear 88 is freely rotatively mounted on main power shaft 19 by way of bearings 89. The torque rating of the primary energy storage springs 85 should be at least 25% of the weight of float 36.

Tapered, superimposed secondary energy storage springs 90 is fixedly secured at their smaller ends 91 to secondary input gear 92 which meshingly engages primary output gear 88 and is rotatively mounted on shaft 93 by way of bearings 94. Shaft 93 is mounted on equipment rails 16 and 17 by shaft mounting brackets 95.

The larger ends 96 of secondary energy storage springs 90 are fixedly secured to secondary output gear 97 which is rotatively mounted on shaft 93 by bearings 98.

The secondary energy storage springs 90 are more flexible than primary energy storage springs 85 although basically of the same design. One full turn on primary spring 85 will result in twelve turns on secondary spring 90. As mentioned above, both the primary and secondary energy storage springs are tapered thus creating a strong end and a weaker end.

The third or final tapered coil spring of the present invention is indicated at 99 and acts as energy converter or regulating means. This regulating spring is basically of the same design as secondary storage spring 90 and although it is not as strong, it is strong enough to drive the multi-kilowatt generator as hereinafter discussed in greater detail.

The energy regulating spring 99 is fixedly secured at its smaller end 100 to energy regulating gear 101 which operatively meshes with secondary output gear 97. This regulating gear 101 is so sized that it reduces the RPM thus increasing drive power of the system of the present invention.

Energy regulating gear 101 is fixedly secured to energy converter shaft 102 which is rotatively mounted on mounting rails 16 and 17 by supported bearings 103.

A speed control 104 is operatively connected to converter shaft 102 and is preferably in the form of a worm gear. This speed control prevents energy regulating spring 99 from receiving excessive torque while at the same time giving it a constant RPM input. Since speed control devices of this type are well known to those skilled in the art, further detailed discussion of the same is not deemed necessary.

The larger end 113 of regulating spring 99 is fixedly attached to output gear 105 which is rotatively mounted about converter shaft 102 on bearings 106. This last mentioned gear is of the beveled type and meshingly engages bevel drive gear 107. This drive gear 107 is smaller than output gear 105 thus making it a high-speed gear.

Drive gear 107 is fixedly secured to drive shaft 108 of torque converter 109. This torque converter is preferably of the hydraulic type and reduces the high speed RPM of drive gear 107 to low speed, high torque output to generator drive shaft 110. This drive shaft is operatively connected to electric generator 111 which in turn is operatively connected to power transmission lines 112 in the normal manner.

Presuming that float portion 36 of the wave energy transducer 13 has an effective weight of 25,000 pounds, with appropriate gear ratios 1260 million foot pounds, or 875,000 foot pound/minute per day can be stored in the energy storage portion 14 of the present invention. This will drive, through torque converter 109, the generator drive shaft 110 at 900 RPM with high torque. At this speed generator 111 will have a constant output of approximately 1,000 kilowatts.

Although not specifically shown, the energy storage portion 14 of the present invention including the primary and secondary energy storage springs 85 and 90 as well as the energy regulating spring 99 is enclosed within a housing or housings so that the humidity and temperature of such springs can be controlled for optimal energy storage operation.

From the above it can be seen that the present invention has the advantage of providing a highly efficient electricity generating system which uses both wave action and tidal rise and fall as energy sources. The energy from these energy sources in stored in the energy storage portion of the present invention which gives a steady output to the generator during calm periods as well as during mean high and low tidal conditions. Once the initial installation and equipment cost have been recouped, maintenance is the only expense required to obtain a constant, around-the-clock electrical output.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. An electricity generating system using either wave or a combination of wave and tidal movement as a prime source of driving energy comprising: a wave energy transducer means; means operatively connecting said transducer to a tapered, superimposed primary energy storage spring means; a tapered, superimposed secondary energy storage spring means operatively connected to said primary energy storage means; an energy regulating spring means operatively connected to said secondary energy storage means; speed control means operatively associated with said means connecting said secondary energy storage means and said energy regulating means whereby a relatively constant RPM can be achieved; and a combination torque converter and speed reducer means operatively connecting said energy regulating means to an electrically generating means whereby wave and/or combined wave and tidal energy can be transferred to an energy storage means and released therefrom at a constant rate to drive an electricity generating means.

2. The system of claim 1 wherein the energy transducer is a float type means.

3. The system of claim 2 wherein said float type means is of the captive type.

4. The system of claim 1 wherein said transducer means is operatively connected to said energy storage means by a pivoted beam means.

5. The system of claim 4 wherein said beam is counterbalanced.

6. The system of claim 1 wherein the means operatively connecting said transducer means to said energy storage means includes a clutch means to impart unidirectional movement to said spring-like means.

7. The system of claim 1 wherein the torque converter and speed reducer means is of the hydraulic type.

8. The system of claim 1 wherein said energy regulating means is a tapered, superimposed spring means.

* * * * *